Dec. 22, 1959     A. FENER     2,918,106
DUPLEX HEAT SEALING MACHINE
Filed Jan. 16, 1956     2 Sheets-Sheet 1
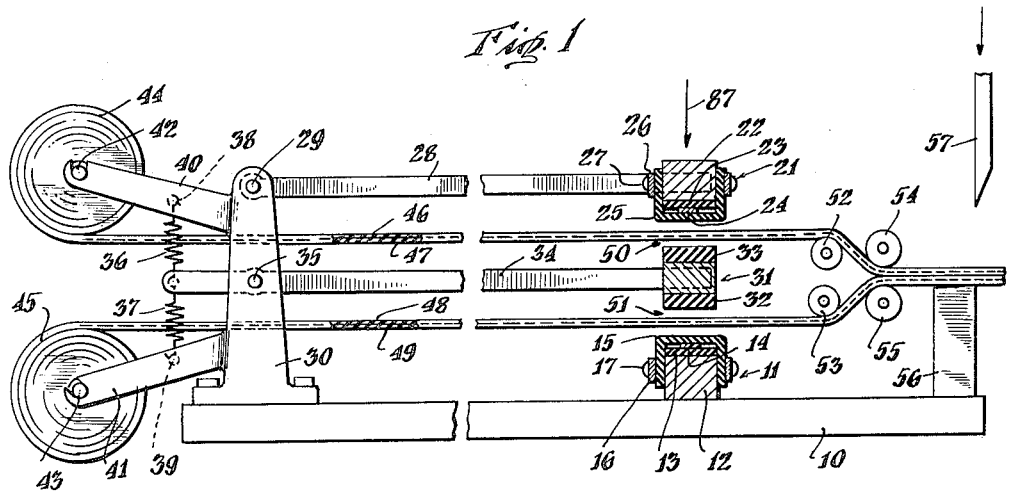
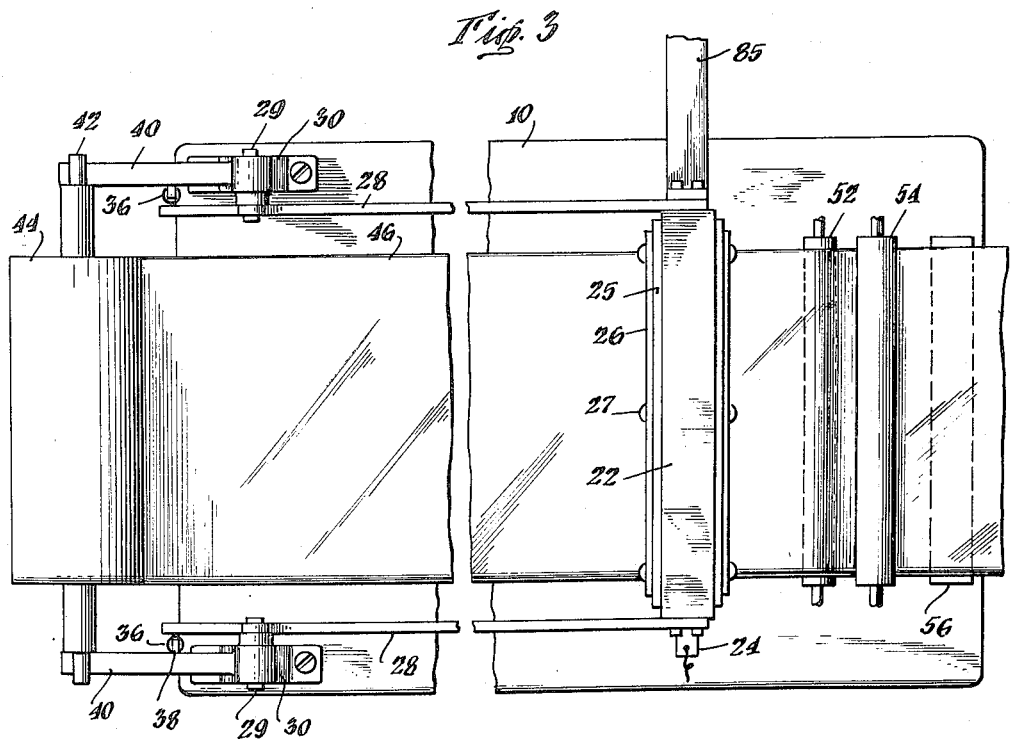
INVENTOR
Alfred Fener
BY
ATTORNEY

United States Patent Office 2,918,106
Patented Dec. 22, 1959

2,918,106

DUPLEX HEAT SEALING MACHINE

Alfred Fener, Brooklyn, N.Y., assignor to Nicholas Langer, New York, N.Y.

Application January 16, 1956, Serial No. 559,359

10 Claims. (Cl. 154—42)

This invention relates to the art of heat sealing thermoplastic films, and, more particularly, to a novel and improved heat sealing machine and method of the thermal impulse type.

As disclosed in Langer patent 2,460,460, heat sealing machines of the thermal impulse type essentially comprise a pair of pressure members or bars and a reciprocating mechanism therefor whereby pressure may be applied upon two or more layers of thermoplastic film to be heat sealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinylidene chloride). A heater element in the form of a thin and narrow strip of a metal of high specific resistance, such as a suitable nickel-chromium alloy known in the trade as Nichrome, is mounted on the face of one of said bars, constituting the operating or sealing face of the machine. Sealing pulses of electric current may be passed through the heater element under the control of a switching mechanism, the operation of which is coordinated to that of the reciprocating mechanism of the bars.

During the operation of the machine, operation of the sealing mechanism is initiated substantially when the pressure members arrive into their pressure-applying position. A short pulse of current is then passed through the heater element, which, as a result of its low heat capacity, is heated to heat sealing temperature in a small fraction of a second. The heat thus produced is immediately transferred by surface contact to the region of the thermoplastic layers compressed between the bars, causing heat sealing thereof. A short period thereafter, the heat produced by the pulse of current is dissipated and the resulting seal is cooled and consolidated under pressure whereby a strong and sound seal is obtained.

Heat sealing machines of the thermal impulse type provide important advantages over heat sealing machines in which the sealing member is continuously maintained at a constant sealing temperature. Due to the fact that the thermal impulse principle permits the sealed region to cool and to consolidate under pressure, the quality of the seal is greatly improved. Also, the thermal impulse principle makes it possible to readily seal films of materials, which cannot be sealed on an industrial scale with sealing members continuously maintained at constant sealing temperatures, such as particularly Polythene and Saran.

Although heat sealing machines of the thermal impulse type provided excellent results and are now being used on a very extensive scale, certain practical difficulties were experienced when it was desired to apply the principle to high-speed packaging machinery where it may be desirable to provide as many as two or more complete sealing cycles per second. The reason for this difficulty was that a certain minimum time had to be allowed both for heating up the heater element to sealing temperature and then for cooling it to its initial temperature, these two operations constituting a complete sealing cycle. It was possible to somewhat shorten the sealing cycle by using suitable expedients. Thus, the heat-up period could be reduced by applying a sealing pulse of current of higher intensity to the heater element or by providing two heater elements, one on each pressure bar, so that sealing heat was applied to the thermoplastic layers from both directions simultaneously. The cooling period could be reduced by various forced cooling arrangements. Both of these expedients, however, had definite limitations.

The efficiency of all packaging equipment, including heat sealing machines, is generally judged on the basis of output, expressed as the number of units produced per hour. A higher hourly output permits amortizing the initial cost of the equipment at a higher rate and also reduces the labor cost represented by the wages of the operator to be apportioned to each unit manufactured, and thus provides a substantial economic advantage. For these reasons, the relatively slow operation of heat sealing machines of the thermal impulse type constituted a problem which interfered with applications of the thermal impulse principle to certain types of high speed packaging machinery.

I have discovered that the problem may be solved in a remarkably simple manner.

It is an object of the present invention to improve heat sealing machines, particularly heat sealing machines of the thermal impulse type.

It is another object of the present invention to provide a novel and improved heat sealing machine capable of producing a plurality, such as two, complete and independent seals at the same time.

It is a further object of the invention to provide a novel and improved heat sealing machine of the thermal impulse type capable of duplex operation, that is, of the simultaneous production of two independent seals without any appreciable structural complications or increase in the overall dimensions of the machine as compared with present impulse sealing equipment producing only one seal at a time.

It is also within the contemplation of the invention to provide a duplex heat sealing machine of the thermal impulse type which is simple in construction, is efficient and economical in operation, which may be readily manufactured on a practical and industrial scale at a low cost.

Other and further objects of the present invention will become apparent from the following description, taken in conjunction with the accompanying drawing, in which:

Fig. 1 is a side elevational view, somewhat diagrammatic and fragmentary in character and having parts in section, of a heat sealing machine embodying the principles of the present invention;

Fig. 3 is a top elevation of the machine shown in Figs. 1 and 2.

Figure 2:
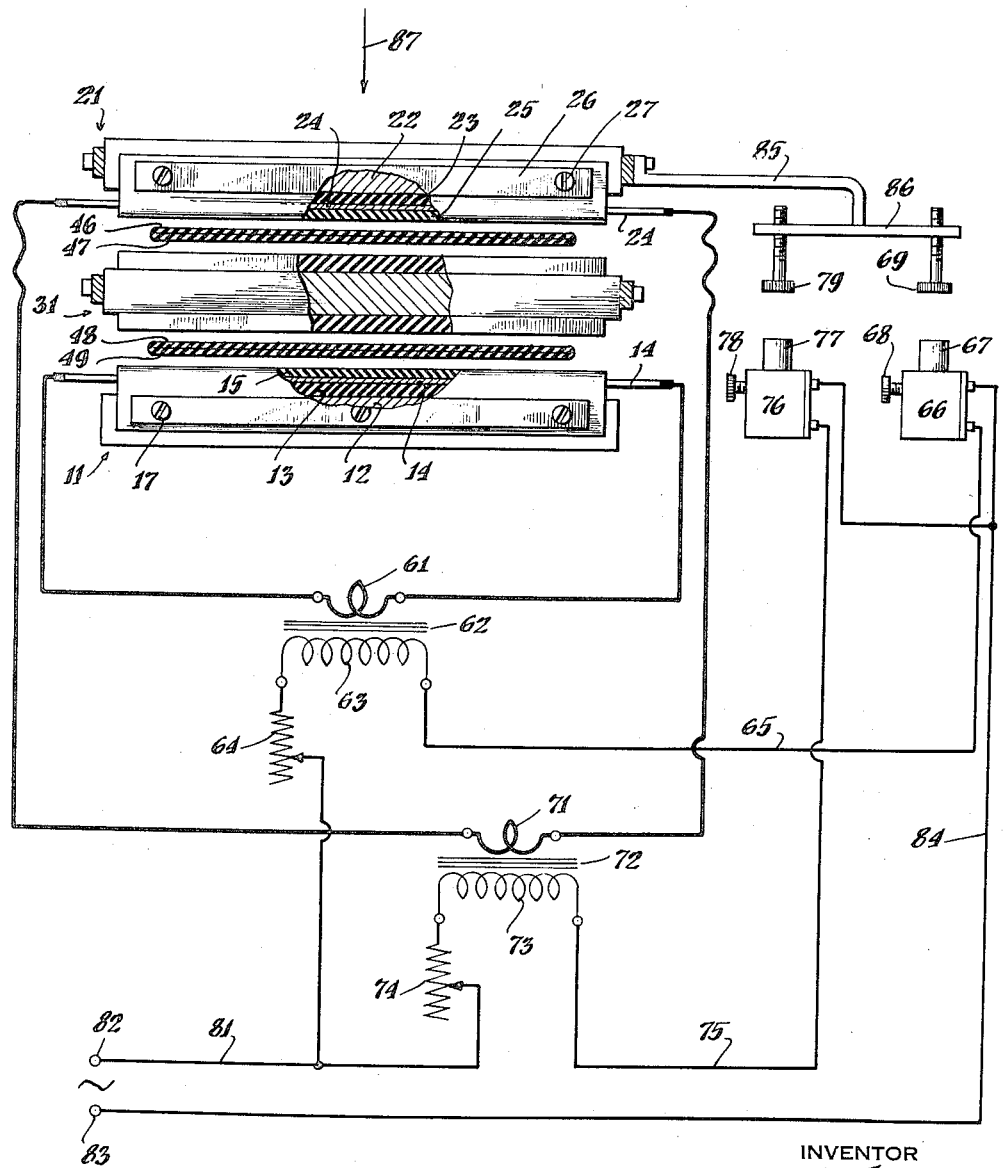
Fig. 2 is a front elevational view of the machine shown in Fig. 1.

Broadly stated, in accordance with the principles of the present invention, I provide a stationary sealing bar and a movable sealing bar, both of which are preferably of the thermal impulse type and comprise an elongated heater element of very low heat capacity capable of rapid heating to sealing temperature by the passage of a pulse of current therethrough and capable of rapid cooling thereafter. A common pressure member or bar is arranged between the two sealing bars in a resiliently mounted or floating position so that in the initial or normal position of the machine, the said pressure bar is spaced from both sealing bars defining therewith two sealing stations. A pair of thermoplastic layers may be inserted in each of said sealing stations and placed under compression by displacing the movable pressure bar toward the stationary sealing bar, thereby taking along the resiliently mounting floating pressure bar and moving it toward said stationary sealing bar. The two seals, one in each sealing station, are completed by passing a short pulse of current through the heater elements of both heater bars and then allowing the seals to cool under pressure, whereupon the several bars may be separated from each other and the two pairs of sealed layers removed.

Referring now more particularly to Figs. 1 to 3 of the drawing, reference numeral 10 denotes a chassis or frame upon which is mounted a stationary sealing bar 11 comprising a base 12 of metal of high heat conductivity, such as aluminum. The top surface of base 12 is covered with a thin layer of heat-resistant insulation 13 over the longitudinal center region of which there is tensioned a heater element 14 in the form of a thin and narrow ribbon of a metal of high specific resistance, such as Nichrome. The sealing structure is covered with a second layer or strip of flexible, heat-resistant insulation 15, the longitudinal marginal portions of which are folded over the sides of base 12 and are secured thereto by means of metal plates 16 and screws 17. A suitable material for forming insulating layers 13 and 15 is fiberglass fabric impregnated with Teflon (tetrafluoroethylene).

Movable sealing bar 21 is reciprocably mounted directly above and is substantially identical in structure with stationary sealing bar 11. It comprises base 22, first layer of insulation 23, heater element 24, second layer of insulation 25, metal plates 26 and screws 27. The movable sealing bar is secured at one end of levers 28, the other end of which is pivotally supported by pins 29 in the upper portion of brackets 30 mounted on chassis 10.

Pressure bar 31 is reciprocably mounted between the stationary and movable sealing bars 11 and 21 and comprises a pair of layers 32 and 33 of a heat-resistant elastomer, such as a suitable grade of silicone rubber, which are oppositely spaced from the operating faces of the corresponding sealing bars 11 and 21. The common pressure bar 31 is secured to one end of levers 34, the other end of which is pivotally mounted on brackets 30 by means of pins 35. Levers 34 are resiliently maintained in their normal position in which the pressure bar 31 is uniformly spaced from both sealing bars 11 and 21 by means of coil springs 36 and 37, one end of which is attached to levers 34 and the other end of which is attached to fixed points 38 and 39 on extensions of brackets 30, above and below pin 35, respectively.

Bracket 30 is provided with integrally formed extensions or arms 40 and 41, carrying shafts 42 and 43 therebetween upon which are rotatably supported supply rolls 44 and 45 of thermoplastic material, respectively. Preferably, this material is in the form of a flattened tubing of a suitable plastic, such as, for example, polyethylene, and comprises a pair of superposed layers. As it will be noted in Fig. 1, layers 46 and 47, unwound from upper roll 44, and layers 48 and 49, unwound from lower roll 45, are respectively passed through upper and lower sealing stations 50 and 51 and are then brought into superposed relation by means of pairs of guide rolls 52, 53 and 54, 55. The four superposed layers 46, 47, 48, 49 are passed over an anvil 56 and may be separated into individual lengths by means of cutting knife 57.

The electrical and timing circuit of the machine is best observed in Fig. 2. The ends of heater element 14 of the lower sealing bar 11 are electrically connected to the terminals of secondary winding 61 of a step-down transformer 62 and the ends of heater element 24 of the upper sealing bar 21 are electrically connected to the terminals of secondary winding 71 of another step-down transformer 72. One terminal of primary winding 63 of transformer 62 is connected through a rheostat 64 and lead wire 81 to one terminal 82 of a source of alternating current, and one terminal of primary winding 73 of transformer 72 is connected through a rheostat 74 and lead wire 81 to the same terminal 82 of the source. The other terminal of primary winding 63 is connected through lead wire 65 to one terminal of time delay switch 66 and the other terminal of primary winding 73 is connected through lead wire 75 to one terminal of another time delay switch 76. The other terminal of both time delay switches 66 and 76 is connected to the other terminal 83 of the alternating current source through lead wire 84.

The time delay switches 66 and 76 are of the type that upon depression of their actuating plungers 67 and 77, respectively, they immediately close an electrical circuit in which they are connected and automatically open the said circuit a predetermined time delay period thereafter, the length of said period being adjustable by means of the setting of screws 68 and 78, respectively. As time delay switches of the described character, which may be of the mechanical, pneumatic, or electrical type, are well known to those skilled in the art, it will not be necessary to describe their construction and operation in detail, particularly as they do not form part of the present invention.

Upper or movable sealing bar 21 is provided with a horizontally extending actuating rod 85, the downwardly bent end portion of which carries a horizontal plate 86 with a pair of set screws 69 and 79 threadedly inserted therein. These set screws are arranged for cooperation with actuating plungers 67 and 77 of time delay switches 66 and 76, respectively.

From the foregoing description, the operation of the heat sealing machine of the invention will be readily understood by those skilled in the art. When it is desired to heat seal thermoplastic layers 46, 47 and 48, 49, in heat sealing stations 50 and 51, respectively, upper or movable sealing bar 21 is displaced downwardly by any suitable reciprocating mechanism, diagrammatically indicated by arrow 87. During its downward displacement, the upper sealing bar will come into contact with upper pressure face 33 of the floating pressure bar 31 and displace the said pressure bar downwardly until its lower pressure face 32 is brought into contact with the lower or stationary sealing bar 11. Thus, sealing pressure is being applied to both pairs of thermoplastic layers, layers 46, 47 being confined between the upper sealing bar 21 and upper pressure face 33 of the floating pressure bar 31, and layers 48 and 49 being confined between the lower pressure face 32 of said pressure bar and the lower sealing bar 11.

Upon the sealing and pressure bars arriving into their pressure-applying position, set screws 69 and 79 carried by plate 86 will strike against actuating plungers 67 and 77 of time delay switches 66 and 77, respectively, and will depress the same, thus initiating the operation of the said switches. The switches will close the circuits of primary windings 63 and 73 of transformers 62 and 72, thereby inducing an alternating current of low voltage and high intensity in the respective secondary windings 61 and 71. In view of the low heat capacity of heater elements 14 and 24, which are respectively connected across the two secondary windings, the said heater elements will be heated to heat sealing temperatures practically instantaneously, causing heat sealing of the thermoplastic layers with which they are in intimate heat exchange relation through the interposed thin insulating layers 15 and 25, respectively.

A short period thereafter, the time delay switches 66 and 76 will automatically break the circuits of the two primary windings of the transformers. Thus, heater elements 14 and 24 are deenergized and their temperature will rapidly return to the initial temperature as a result of their low heat capacity and due to the fact that they are in intimate heat exchange relation with the respective metal bases 12 and 22 through the thin layers of interposed insulation 13 and 23. Preferably, pressure is maintained upon the thermoplastic layers for a short period thereafter to permit the sealed regions to cool and to consolidate under pressure, thereby to develop the full strength of the seal. Thereupon the bars are opened by returning movable sealing bar 21 into its initial position, whereby the common pressure bar 31 will likewise be returned into its initial position by the biasing effect of springs 36 and 37. A new length of the thermoplastic layers may now be drawn from supply rolls 44 and 45 and the sealing operation may be repeated as many times as desired. The two pairs of sealed thermoplastic layers are brought into superposed relation by means of guide rolls 52, 53 and 54, 55 and may be cut off in a single operation by cooperation of cutting blade 57 and anvil 56. It is preferred to employ flattened plastic tubing wound up on rolls 44 and 45 and to cut through the two transversely sealed tubings immediately after the sealed regions. Thus, two complete plastic bags, sealed at the bottom and open at the top, will be produced for each operating cycle of the machine.

It will be noted that the pulse of sealing current passed through each of the heater elements 14 and 24 is individually adjustable. Thus, the time upon which the flow of sealing current is started is adjustable by varying the effective length of set screws 69 and 79 arranged for cooperation with actuating plungers 67 and 77 of time delay switches 66 and 76, respectively. The length of the period during which sealing current will flow through the heater elements may be individually regulated by the setting of adjusting screws 68 and 78 of the switches. Finally, the intensity of the pulses of sealing current flowing through heater elements 14 and 24 may be individually adjusted by rheostats 64 and 74, respectively.

The possibility of individually adjusting the intensity and the timing of the two pulses of sealing current has been found extremely helpful in the operation of the machine of the invention on a practical and industrial scale. When the two sealing bars are of identical construction and dimensions and the two pairs of thermoplastic layers are of the same composition and gauge, the individual adjustments may be utilized to compensate for slight differences in the operating characteristics of the two sealing bars and to assure that the two sealing operations carried out substantially simultaneously proceed under optimum conditions. On the other hand, when the material, width or gauge of the two pairs of thermoplastic layers are different, it is possible to provide for a sealing pulse of greater intensity or of longer duration for sealing the material having a greater thickness or a higher sealing temperature. Thus, the provision of individual control of the two sealing cycles greatly increases the flexibility of operation and the practical usefulness of the machine of the invention.

It will be noted that the principles of the invention provide various important advantages. They permit the construction of a heat sealing machine which is hardly more complex or more expensive than a conventional heat sealer, but is capable of producing twice the number of units per hour. Also, the duplex heat sealing machine of the invention is very reliable in its operation, is economical of the operator's time, and, in view of the extreme simplicity of its construction, may be readily manufactured and sold on a practical and industrial scale at a low cost.

Although the present invention has been disclosed in connection with a preferred embodiment thereof, variations and modifications may be resorted to by those skilled in the art without departing from the principles of the invention. Thus, the present invention can be readily applied to heat sealing machines capable of producing more than two seals simultaneously. For example, a multiplex sealer of the described character may comprise a first movable sealing bar having a lower sealing face, a first floating pressure bar having upper and lower pressure faces, a second floating sealing bar having upper and lower sealing faces, a second floating pressure bar having upper and lower pressure faces, and a third stationary sealing bar having an upper sealing face. A machine of this type has four sealing stations and is capable of sealing four pairs of thermoplastic layers simultaneously. Also, the invention is applicable with equal or similar results to heat sealing and other packaging machines employing continuously heated sealing bars. It is further to be noted that instead of employing a movable and a stationary sealing bar with a common movable pressure bar therebetween, it is also possible to mount the pressure bar or pressure-absorbing member in a fixed position and to arrange both sealing bars for reciprocation toward and away fom the common and stationary pressure bar. I consider all of these variations and modifications to be within the true spirit and scope of the present invention as disclosed in the foregoing description and defined by the appended claims.

I claim:

1. A heat sealing machine comprising, in combination, a pair of sealing bars, a pressure-absorbing member interposed between said bars and defining therewith a pair of sealing stations, each of said stations having an open position in which a set of layers of thermoplastic film may be introduced thereinto and a closed position, and means for causing relative displacement of said bars with respect to each other and said member thereby to bring said stations into their closed position and to apply sealing heat and pressure to both sets of layers of thermoplastic film in said stations.

2. A heat sealing machine comprising, in combination, a pair of sealing bars mounted for reciprocation with respect to each other, and a pressure bar mounted between said sealing bars defining therewith a pair of sealing stations, each of said stations having an open position in which a set of layers of thermoplastic film to be heat sealed may be introduced thereinto and a closed position whereby upon reciprocation of said sealing bars towards each other both stations are brought into their closed position to apply sealing heat and pressure onto both sets of layers of film in said station.

3. A heat sealing machine comprising, in combination, a pair of sealing bars mounted for relative displacement with respect to each other, a pressure bar in common for said sealing bars spacedly and reciprocably mounted therebetween and defining therewith a pair of sealing stations, each of said stations having an open position in which a set of layers of thermoplastic film to be heat sealed may be introduced thereinto and a closed position, and means for causing relative displacement of said sealing bars toward one another thereby to bring said stations into their closed position to compress both sets of layers and to apply substantially simultaneously sealing heat and pressure to both sets of layers of film in said stations.

4. A heat sealing machine comprising, in combination, a stationary and a movable sealing bar, and a displaceable pressure bar interposed between said sealing bars and having a pair of pressure faces arranged opposite to and normally spaced from the respective sealing bars and defining therewith a pair of sealing stations, each of said stations having an open position in which a set of layers of film may be introduced thereinto and a closed position whereby upon displacing said movable sealing bar toward the stationary sealing bar both of said stations are brought into their closed position to apply substantially simultaneously sealing heat and pressure to both sets of the layers therein.

5. A heat sealing machine comprising, in combination, a pair of sealing bars displaceably mounted with respect to each other, a displaceable pressure bar interposed between said sealing bars and having pressure faces arranged opposite to the respective sealing bars, resilient means for normally biasing said pressure bar to a floating position between said sealing bars to define therewith a pair of sealing stations, each of said stations having an open position in which a set of layers of thermoplastic film may be introduced thereunto and a closed position, and means for causing relative displacement of said sealing bars toward one another thereby bringing both of said stations into their closed position and substantially simultaneously heat sealing both sets of layers of film therein.

6. A heat sealing machine comprising, in combination, a pair of sealing bars of the thermal impulse type displaceable with respect to each other, each of said bars including a heater element of low heat capacity for heating the bar to sealing temperature by passage of a current pulse therethrough, a common pressure bar interposed between said sealing bars and having a pressure face arranged for cooperation with each of said sealing bars with which it defines a pair of independent sealing stations, each of said stations having an open position in which a set of layers of film may be introduced thereinto and a closed position, means for displacing said sealing bars toward each other thereby bringing said stations into their closed position and applying pressure upon both sets of layers of film therein, and switching means operable in the pressure-applying position of the bars for energizing the heater element of each sealing bar for a period sufficient to heat seal both sets of layers.

7. A heat sealing machine comprising, in combination, a pair of relatively displaceable sealing bars of the thermal impulse type each including a heater element of low heat capacity, a common pressure bar floatingly mounted between said sealing bars and defining therewith a pair of sealing stations, each of said stations having an open position in which a set of layers of film may be introduced thereinto and a closed position, means for causing relative displacement of said sealing bars toward each other thereby bringing said stations into their closed position and applying pressure upon both sets of layers of thermoplastic film therein, switching means operable in timed relation with respect to the pressure-applying position of the bars for passing a pulse of current through the heater element of each sealing bar for a predetermined period thereby to heat seal both sets of layers, and means for individually adjusting the intensity of the pulse of current passed through each heater element.

8. A heat sealing machine comprising, in combination, a pair of relatively displaceable sealing bars of the thermal impulse type each including a heater element of low heat capacity, a common pressure bar floatingly mounted between said sealing bars and defining therewith a pair of sealing stations, each of said stations having an open position in which a set of layers of thermoplastic film may be introduced thereinto and a closed position, means for causing relative displacement of said sealing bars toward each other thereby bringing said stations into their closed position and applying pressure upon both sets of layers of thermoplastic film therein, an energizing circuit for the heater element of each sealing bar, a switching mechanism for each circuit operable in timed relation with respect to the pressure-applying position of the corresponding sealing bar to close its circuit for a period sufficient to cause heat sealing of the set of layers with which the said bar is in contact, and control means for each switching mechanism for independently adjusting for each heater element the time when said period is initiated and the time when said period is terminated.

9. A duplex heat sealing machine comprising, in combination, a pair of sealing bars displaceably mounted with respect to each other, a displaceable pressure bar interposed between said sealing bars and having pressure faces arranged opposite to the sealing faces of the respective sealing bars, means for normally biasing said pressure bar to a position between said sealing bars to define therewith a pair of sealing stations, each of said stations having an open position and a closed position, means for guiding a set of layers of thermoplastic film through each of said stations in their open position, and means for causing relative displacement of said sealing bars toward one another thereby bringing said stations into their closed position and substantially simultaneously heat sealing the regions of both sets of layers of film therein.

10. A bag making machine comprising, in combination, a pair of sealing bars displaceably mounted with respect to each other, a pressure bar interposed between said sealing bars and having a pair of pressure faces arranged opposite to and normally spaced from the respective sealing bars and defining therewith a pair of sealing stations, each of said stations having an open position and a closed position, first guiding means for guiding a flattened tube of thermoplastic film through each of said stations in their open position, means for displacing said sealing bars toward one another thereby bringing said stations into their closed position and substantially simultaneously applying a heat seal to the transverse regions of both flattened tubes in the respective stations, second guiding means for bringing the flattened heat sealed tubes into superposed face to face relation, and cutting means for simultaneously severing the superposed tubes in proximity to the transverse seals thereon thereby producing a pair of bags sealed at one end and open at the other end for each operation.

References Cited in the file of this patent

UNITED STATES PATENTS

| | | |
|---|---|---|
| 2,574,094 | Fener et al. | Nov. 6, 1951 |
| 2,621,704 | Langer | Dec. 16, 1952 |
| 2,697,773 | Gordon | Dec. 21, 1954 |
| 2,721,925 | Langer | Oct. 25, 1955 |
| 2,730,161 | Langer | Jan. 10, 1956 |
| 2,762,420 | Stanton | Sept. 11, 1956 |
| 2,766,809 | Parham | Oct. 16, 1956 |
| 2,770,936 | Clark | Nov. 20, 1956 |
| 2,796,913 | Fener et al. | June 25, 1957 |